Aug. 22, 1939. W. P. COHOE 2,170,678
APPARATUS FOR TREATING MATERIALS
Filed Aug. 18, 1937

INVENTOR
WALLACE P. COHOE
BY Worth Wade
ATTORNEY

Patented Aug. 22, 1939

2,170,678

UNITED STATES PATENT OFFICE

2,170,678

APPARATUS FOR TREATING MATERIALS

Wallace P. Cohoe, Riverdale-on-Hudson, N. Y.

Application August 18, 1937, Serial No. 159,654
In Great Britain July 12, 1937

4 Claims. (Cl. 261—86)

The invention relates to dispersions and more particularly to an apparatus for the production of foams. In the specification and claims, the word "foam" designates a two phase colloidal dispersion comprising a gas or vapor as the dispersed phase and a liquid as the continuous phase.

It is a general object of the invention to provide for efficiently producing a uniform dispersion having a continuous liquid phase.

It is another object of the invention to continuously produce a foam containing very fine gas bubbles.

It is a specific object of the invention to provide an apparatus for producing a uniform foam in a continuous manner.

Other objects of the invention will in part be obvious and will in part appear hereinafter.

According to the invention, a uniform foam is produced in a continuous manner by creating two opposed circular converging currents of the liquid to be foamed, entrapping gas in the currents to cause the liquid to foam, withdrawing foam from the point of convergence of the currents and recirculating the unfoamed liquid in the currents. The foam has a lower specific gravity than the unfoamed liquid, in consequence of which the foam rises above the point of convergence of the currents and may be led away continuously.

The apparatus of the invention comprises in general means for producing two opposed, circular, converging currents of the liquid just below the surface of the pool whereby gas is entrapped in the liquid, means for continuously withdrawing foam from the point of convergence of the currents and means for adding fresh liquid to the pool. In the now preferred embodiment of the invention, the apparatus comprises a vessel adapted to form a pool of liquid, a pair of vertical baffles located above the surface of the pool and dividing the vessel into a central section and two side sections, a rotatable roller being positioned beneath and parallel to the lower edge of each of the baffles and adapted to create two opposed circular converging currents of the liquid.

The walls of the vessel in transverse section are preferably shaped, below the center line of the rollers, to conform to the path outlined by the blades upon rotation of the rollers and the rollers are so spaced that the blades pass within a short distance of each other and of the shaped surfaces of the vessel. Means may be provided for adjusting and varying the clearance between the moving parts and the stationary parts of the apparatus. The rollers are rotated in opposite directions relative to each other so as to carry the liquid being treated from the side chambers upward into the central chamber. Suitable means are provided for feeding liquids to the outer chambers as well as means for withdrawing the dispersion from the central chamber. All parts of the apparatus which contact the substances being treated are made of a suitable non-corrosive material.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawing, in which.

Figure 1:
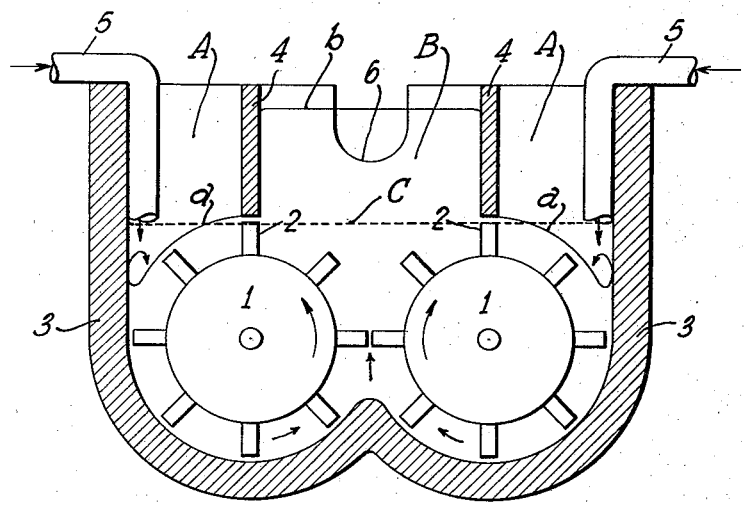
Fig. 1 illustrates a view in cross-section of one embodiment of apparatus of the invention.
Figure 2:
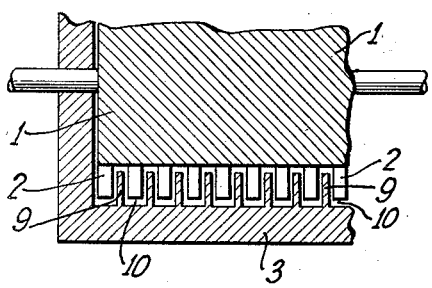
Fig. 2 is a cross-sectional view of a part of another embodiment of the apparatus of the invention.

Referring to Fig. 1, in one embodiment the apparatus of the invention comprises rollers I—I each having a plurality of blades 2 projecting radially therefrom and extending longitudinally for the full length of the rollers. The rollers I—I are rotatably mounted within and adjacent the bottom of the vessel 3, the lower portion of which is shaped to conform substantially with the path outlined by the rotation of the blades 2. Above each of the rollers I—I there are provided vertically adjustable baffles 4 which serve, in part, to divide the vessel 3 into three chambers, to wit, two side chambers A, A, and a central chamber B. The solution to be treated may be supplied through conduits 5 and the treated solution or foam may be withdrawn through the port 6.

In operation of the apparatus of the invention any suitable liquid or fluid composition is introduced through the conduits 5 into one or both of the side chambers A, A, the initial level of the quiescent liquid being indicated by the broken line C. The rollers I—I are caused to rotate in the direction of the arrows, so that the blades 2 carry the fluid down and around from the side chambers A into the central chamber B and back into chambers A. The fluid in the form of a layer is thrown against the side walls of the vessel 3 in the manner shown by the arrows $a$. The action of the rollers causes a folding of the fluid layer whereby surrounding gas becomes entrapped within the fluid. The gas is entrapped in the form of bubbles which become subdivided into minute sizes during operation of the apparatus. By adjusting the distance between the baffles 4 and the rollers 1—1 the amount of solution thrown against the side wall per unit of time may be controlled. That part of the solution which has reached the foam stage rises in the central chamber B by reason of its decreased density and is withdrawn from the vessel 3 at the port 6. The line b indicates the normal level of the foam in chamber B during operation of the apparatus. The operation can be carried on continuously by correlating the rate of feeding the solution into the apparatus with the rate of foam production. The conduits 5 are preferably positioned at one end of the elongated vessel 3 and the foam withdrawing port 6 is located at the opposite end of the vessel so that the fluid being treated is caused to travel along the length of the vessel thereby enhancing the continuity of operation.

Figure 3:
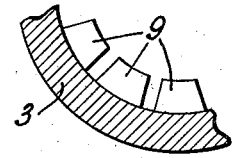
Fig. 3 shows a modified rib construction on the inner surfaces of the vessel of the apparatus of the invention.
Figure 4:
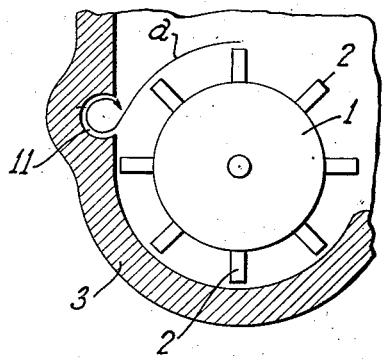
Figs. 4 and 5 illustrate, in part, a modification of the apparatus of Fig. 1.
Figure 5:
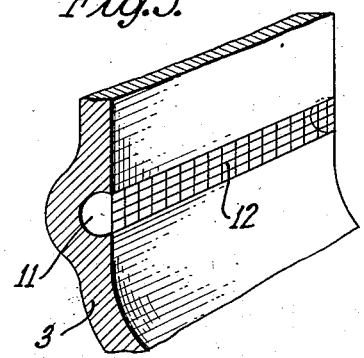

Other embodiments of the invention may be obtained by incorporating into the apparatus shown in Fig. 1 any of the modifications shown in Figs. 2 through 5. In that embodiment shown in Fig. 2, the inner walls of the vessel 3 may be provided with ribs 9 running in a direction transverse to the axes of the rollers 1—1. To cooperate with the ribs 9, the blades 2 are provided with slots or openings 10 to cooperate with the ribs 9 in the manner shown. Such an arrangement further promotes the subdivision of the gas bubbles entrapped in the solution being whipped. The ribs 9 which are discontinuous through their length as shown in Fig. 3, may be thin or thick in a direction transverse the axis of the rollers. The fluid fold indicated by the arrow "a" in Fig. 1 may be augmented as shown in Fig. 4, by providing concave depressions or channels 11 in the side walls of the vessel 3 at the point where the folding action takes place. The channels 11 tend to increase the size of the fluid fold thus increasing the amount of gas entrapped in the solution. Vertical wires or a wire screening 12 may be disposed over the mouth of each channel 11 as shown in Fig. 5, thereby further promoting the subdivision of the gas bubbles entrapped in the solution.

Any suitable gas or gases may be dispersed in a solution by use of the apparatus of the invention. In the event that it is desirable to disperse a gas under pressure a suitable top may be mounted on the vessel 3 to render the apparatus gas tight.

The apparatus of the invention is adapted for making various dispersions of gases in liquids or liquids in liquids and the term "liquids" is intended to include solutions. By varying the speed of the rollers and the clearance of the moving parts to the stationary parts, the apparatus may be modified to carry out various types of mixing operations such, for example, as dispersing, homogenizing, dissolving, emulsifying, etc. Accordingly, the apparatus has a wide range of applications and may be employed for the production of colloidal dispersions in general, and in particular, for making emulsions, pastes, mousse, foams, froths, solutions, suspensions, etc. For use in confections, pastry, salad dressings, coating compositions in general, dressings for textiles, printing pastes, detergents, etc.

The apparatus of the invention is particularly adapted for treating cellulosic solutions of the type disclosed in my co-pending U. S. application, Serial No. 113,002 filed November 27, 1936. It is to be understood, however, that it is within the purview of the invention to employ the herein disclosed apparatus for treating other foam-forming fluids.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense.

Having described my invention, what I claim as new and desire to secure by Letters Patent is:

1. In an apparatus for forming a foam in a continuous manner, the combination of a vessel adapted to contain a pool of liquid, a pair of vertical baffles located above the surface of the pool, a rotatable roller having blades projecting therefrom and positioned adjacent and parallel to the lower edge of each of the baffles, means to rotate said rollers in opposite directions to produce two opposed circular converging currents of the liquid and means to supply liquid to at least one of said currents prior to the convergence.

2. In an apparatus for forming a foam in a continuous manner, the combination of a vessel for maintaining a pool of liquid and having a pair of vertical baffles dividing it into a central section and two side sections, a rotatable roller positioned beneath and parallel to the lower edge of each baffle and adjacent the upper surface of said pool, said rollers having a plurality of blades disposed longitudinally thereon and projecting radially therefrom, means for rotating said rollers in opposite directions to produce two opposed circular converging currents of the liquid, the point of convergence being beneath the central section of the vessel, means to withdraw foam from the central section of said vessel and means to supply liquid to at least one of said currents prior to the convergence.

3. In an apparatus for forming a foam in a continuous manner, the combination of a vessel having a pair of vertical baffles dividing it into a central section and two side sections, a rotatable roller positioned beneath and parallel to the lower edge of each baffle, said rollers having a plurality of slotted blades projecting radially therefrom and ribs on the inner walls of said vessel cooperating with the slots in said blades.

4. In an apparatus for forming a foam in a continuous manner, the combination of a vessel adapted to maintain a pool of liquid, a pair of vertical baffles located above the surface of the pool, a rotatable roller positioned beneath and parallel to the lower edge of each of the baffles and means to rotate said rollers in opposite directions to produce two opposed circular converging currents of the liquid, the walls of said vessel being provided with horizontal channels positioned at the level of the liquid during rotation of the rollers.

WALLACE P. COHOE.